(12) United States Patent
McCulley (10) Patent No.: US 8,053,940 B2
(45) Date of Patent: Nov. 8, 2011

(54) MAGNETIC MOTOR GENERATOR HAVING A FLOATING FLYWHEEL

(76) Inventor: Michael Marion McCulley, Benicia, CA (US)

(*) Notice: Subject to any disclaimer, the term of this patent is extended or adjusted under 35 U.S.C. 154(b) by 762 days.

(21) Appl. No.: 12/215,896

(22) Filed: Jul. 1, 2008

(65) Prior Publication Data
US 2009/0072771 A1    Mar. 19, 2009

Related U.S. Application Data

(60) Provisional application No. 60/994,013, filed on Sep. 17, 2007.

(51) Int. Cl.
*H02K 7/09* (2006.01)
*H02K 16/00* (2006.01)

(52) U.S. Cl. .......... 310/74; 310/90.5; 310/113; 310/157

(58) Field of Classification Search .................... 310/74, 310/90.5, 113, 157, 166
See application file for complete search history.

(56) References Cited

U.S. PATENT DOCUMENTS

| | | | | |
|---|---|---|---|---|
| 5,495,221 A | * | 2/1996 | Post | 335/299 |
| 6,664,680 B1 | * | 12/2003 | Gabrys | 310/74 |
| 6,707,187 B1 | * | 3/2004 | Gabrys | 310/74 |
| 2004/0245877 A1 | * | 12/2004 | Khalizadeh | 310/113 |

* cited by examiner

*Primary Examiner* — Quyen Leung
*Assistant Examiner* — David W. Scheuermann

(57) ABSTRACT

A magnetic motor generator that produces electric power by rotating a one piece magnetic floating flywheel assembly that is operated by a linear induction motor and repelled upward by a stationary natural magnet. The floating flywheel assembly magnetic axel rotates inside magnetic collar bearings, which have repelling stationary magnets to center the axel at speed. The floating flywheel assembly rotors move inside generator stators to generate electric power. The floating flywheel assembly has no physical contact with other components to prevent bearing losses at speed. A timing computer controls the operation of the linear induction motor, assesses the speed of the floating flywheel assembly and fires only when necessary to maintain rotation. The moving components are enclosed in a vacuum chamber to prevent wind resistance, or windage losses at speed. Surplus electric power can ether be stored/used by the system or used to supply a load.

5 Claims, 8 Drawing Sheets

MAGNETIC MOTOR GENERATOR HAVING A FLOATING FLYWHEEL

FIELD OF THE INVENTION

The present invention relates generally to electric power generation, and specifically to motor generators that make use of natural forces.

BACKGROUND OF THE INVENTION

Many conventional designs already exist for producing electricity by spinning the rotor assemblies of AC/DC generators, and some make use of natural forces, such as generators that use flowing water, as in hydroelectric systems, or by the use of wind-power, such as in wind turbine systems. There are also thermal systems drawing heat from the ground, which turns steam-powered turbines, which in turn rotate a generator to produce electricity. Solar powered electricity produced by systems that use photovoltaic solar panels are also commonly known. Such conventional designs suffer several disadvantages.

One disadvantage of such conventional designs is that they often rely on weather conditions to generate power. Hydroelectric power relies on the water supply and rainfall conditions. Wind turbines rely on wind conditions and weather systems moving through a given area. Thermal power will rely on the small abundance of hot-springs or other natural heat sources to produce the steam needed to operate the systems. Solar power can only be achieved in the daytime and often relies on direct sunlight for best results. Weather conditions can be unpredictable and often unreliable.

Another major disadvantage of such conventional designs is that they are usually fixed to one given location where predictable weather patterns can be forecast. With the exception of small portable solar panels, such systems are often fixed to the environment where they are originally installed and sometimes take up a large amount of space.

SUMMARY OF THE INVENTION

The present invention incorporates a magnetic motor generator having a floating flywheel that can overcome some of the disadvantages of other conventional electric power generating systems, and some that make use of natural forces. The present invention will supply temporary electric power, or extend and enhance the power supply of conventional systems. One advantage of the present invention is that it will not rely on weather conditions to generate electric power. Another advantage of the present invention is that it will also be capable of providing portable electric power. The present invention can easily be installed where needed to deliver standby electric power at the source, or it can utilize several units connected together by electric power lines to transmit power over land distances. Optionally, the present invention can be installed in an ocean going vehicle-based application to deliver emergency or transient peaking power for ocean going systems. Optionally, the present invention can be installed in ground transportation systems to deliver additional standby power to ground-based hybrid power systems, or in ground facilities where space is limited, or where weather is unpredictable.

The present invention uses a combination of natural magnetic force and powered magnetic force to rotate a floating flywheel assembly, which in turn rotates the rotors of an electric power generator application in order to generate energy for use outside the system. The present invention is the first of its kind to use the specific combination of components that comprises this new magnetic system. The floating flywheel assembly in the present invention will maximize the operating efficiency, mechanical advantage and viability of the system. The floating flywheel assembly is comprised of several parts held together as one moving piece. The floating flywheel assembly is comprised of a magnetic wheel connected to a metal disk that is rotated by a linear induction motor. The flywheel has an axel that is held in place by two magnetic collar bearings, such as active magnetic bearings, to reduce bearing losses at speed. The axel is connected to the flywheel and a rotor section of an electric power generator, and the whole floating flywheel assembly itself is held away from the ground and other components by an additional larger stationary natural magnet. The floating flywheel portion of the present invention will sit above a gap of space between itself and the stationary natural magnet in order to eliminate friction between itself and all other components. The stationary natural magnet does not draw any electrical power, and more than one may be required.

Additionally, the present invention uses a linear induction motor to rotate the floating flywheel assembly by powered magnetic force, and the linear induction motor will have a gap of space between itself and the floating flywheel. A timing computer controls the operation of the linear induction motor. The purpose of the timing computer is to assess the speed of the flywheel and then fire the linear induction motor temporarily and only when necessary to maintain flywheel rotation. The purpose of the controlled firing of the linear induction motor is to conserve energy and minimize losses, keeping the linear induction motor offline as much as possible. The flywheel will free-spin at speed, without being constantly driven by the linear induction motor. As the flywheel slows down, the linear induction motor will fire, controlled by the timing computer, only when necessary and with minimal power to keep the flywheel rotating during operation.

Finally, the present invention uses a vacuum chamber that is installed around the rotating floating flywheel assembly and generator components. The vacuum chamber encloses all moving components to prevent wind resistance, or windage losses during operation, such as excessive air passing over the flywheel. The vacuum chamber will also provide for less noise during operation.

The present invention will provide for the expanded operating efficiency of current electric power generation systems. If used as a flywheel battery, sometimes called a "motor generator set," the rotating axel can have both a DC motor and/or an AC generator installed, and either can be the motor depending on whether the system is charging the battery storage from the AC/DC conduit or supplying an emergency AC power load from the batteries. The primary purpose of the present invention can be thought of as an inertia-based standby system with virtually no losses at speed, waiting to deliver a power load for emergency or transient peaking power. With no windage and no bearing losses at speed, the present invention can be thought of in standby mode, ready to deliver transient power by converting the stored rotational mechanical energy of the floating flywheel assembly back into electric power, and with minimal power to keep the flywheel rotating at speed. If used as a power transmitter, electric power can be provided by one unit, or several units can be connected together to transmit power in steps from electric power stations over land to end users.

BRIEF DESCRIPTION OF THE FIGURES

FIG. 1 represents an overview of the magnetic motor generator having a floating flywheel.

FIG. 4 represents the generator component, axel, rotors and stators.

FIG. 5 represents the natural magnet component.

FIG. 6 represents the linear induction motor and timing computer, AC/DC inverter.

FIG. 7 represents the battery storage component.

FIG. 8 represents the vacuum chamber component.

DETAILED DESCRIPTION OF THE FIGURES

FIG. 1 represents an overview of the magnetic motor generator having a floating flywheel.

Figure 1A:
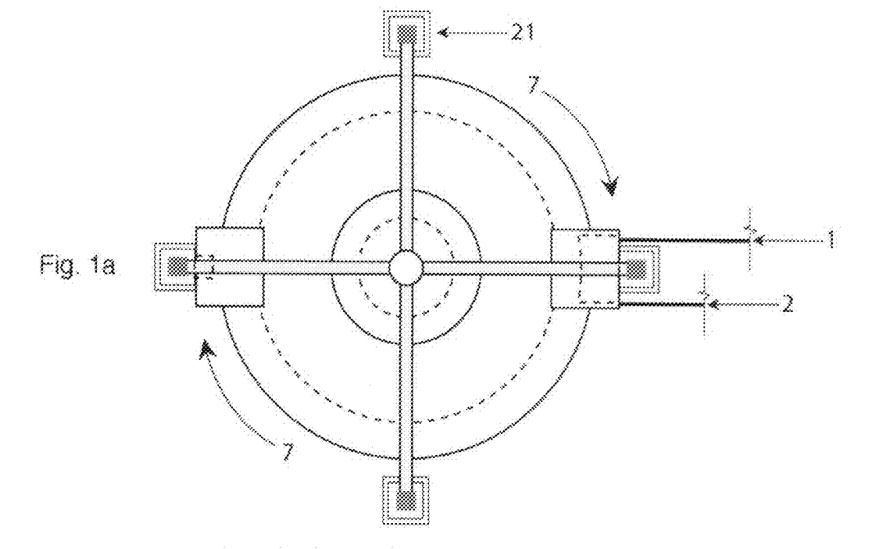
FIG. 1a represents a top view.

FIG. 1a represents a top view. A frame 21 with four legs will support all of the components that are attached to it. The direction of flywheel rotation 7 is shown in the top view.

Figure 1B:
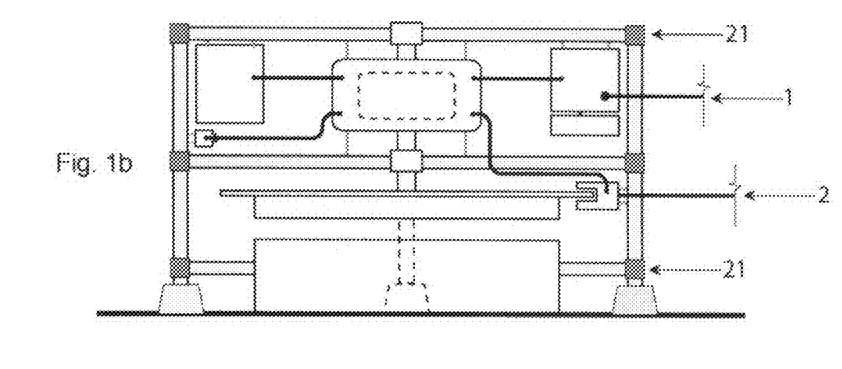
FIG. 1b represents a front view.

FIG. 1b represents a front view. Two legs of the frame 21 are shown as dashed lines and have been cut away in the front view to show the system components clearly, and this cut away will be applied to other drawings herein. Electric power is sent into the magnetic motor generator from an outside source via an electrical conduit 2 to drive the system. Surplus electric power is sent outside of the magnetic motor generator via an electrical conduit 1 to be used by other systems, receivers or to supply a load.

Figures 2, 2A, 2B, 2C:
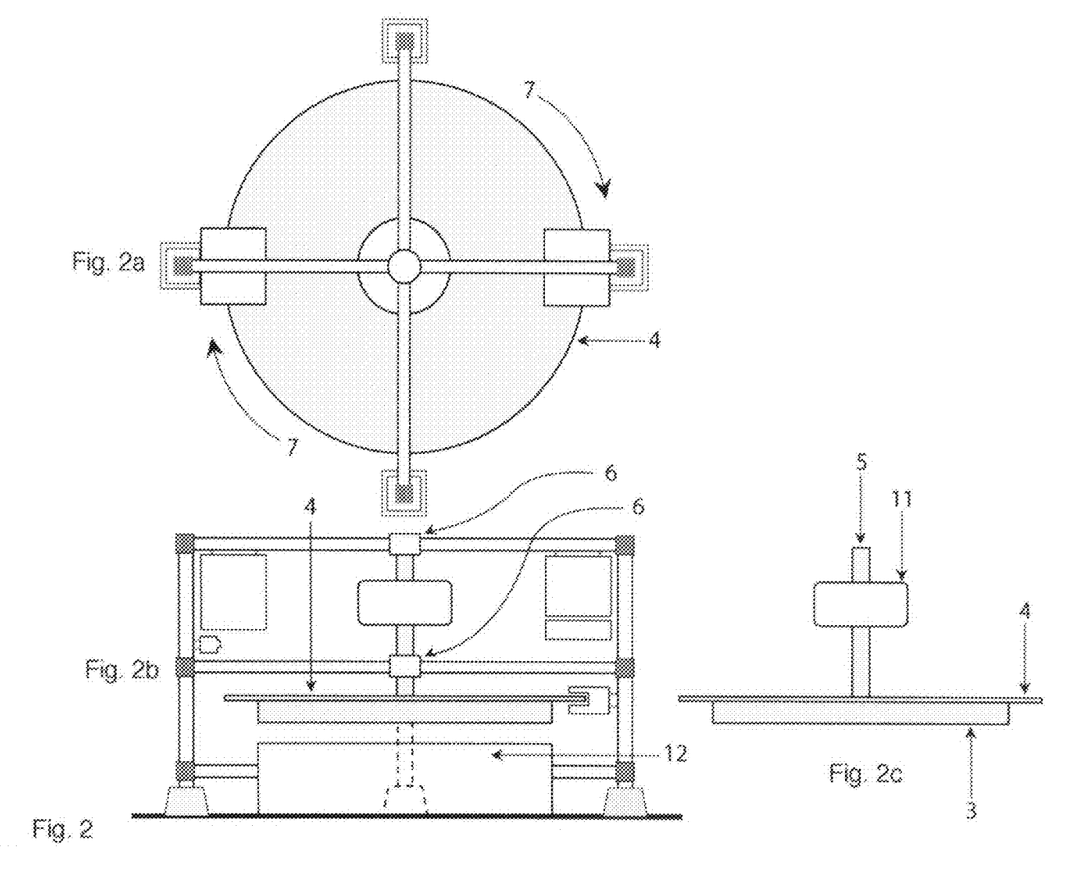
FIG. 2 represents the floating flywheel assembly and components.
FIG. 2a represents a top view and the direction of rotation.
FIG. 2b represents a front view.
FIG. 2c represents a side view.

FIG. 2 represents the floating flywheel assembly and components, which are built as one piece.

FIG. 2a represents a top view and the direction of rotation 7. The metal disk 4 rotates and is a part of the floating flywheel assembly.

FIG. 2b represents a front view. The floating flywheel assembly axel 5 rotates inside two magnetic collar bearings 6, such as active magnetic bearings. The magnetic collar bearings 6 allow for the rotating motion of the floating flywheel axel 5 without bearing losses, as well as slight up and down floating movements along in axle 5. The floating flywheel assembly is held off of the ground and in place by the stationary natural magnet 12, which is placed underneath the flywheel assembly. The rotating floating flywheel assembly rides on the magnetic force provided by the natural magnet 12, which prevents the resistance caused by natural gravity on the rotating flywheel assembly.

FIG. 2c represents a side view. The floating flywheel assembly is comprised of a magnetic wheel 3, a metal disk 4 and an axle 5. Additionally, the floating flywheel assembly in comprised of a rotor component 11, that rotates inside a generator component 9 herein FIG. 4, to generate electric power.

Figures 3, 3A:
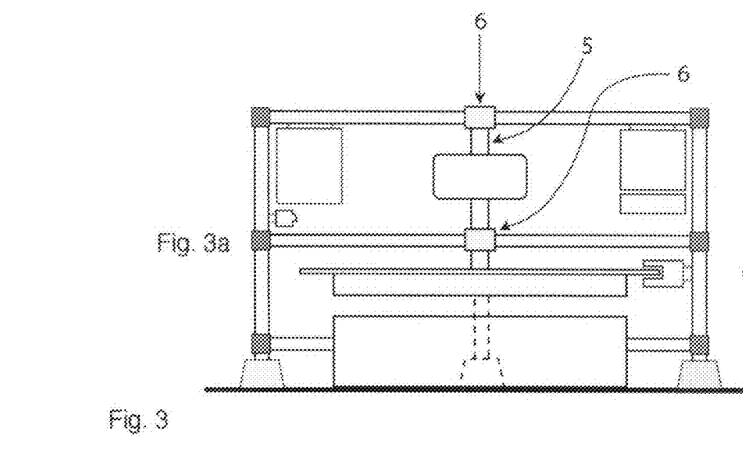
FIG. 3 represents the two magnetic collar bearings and the floating flywheel axel.
FIG. 3a represents a front view.

FIG. 3 represents two magnetic collar bearings and the floating flywheel axel.

FIG. 3a represents a front view. The two magnetic collar bearings 6 are placed along the rotating floating flywheel axel 5.

Figure 3B:
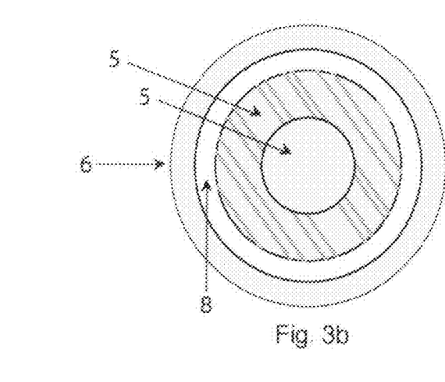
FIG. 3b represents a top view detail.

FIG. 3b represents a top view detail. The axel 5 is not solid steel, but a metal shaft surrounded by donut-like magnets that have a magnetic charge, and the collar bearings 6 have repelling stationary magnets to center the axel 5 at speed, such as in an active magnetic bearing. The gap 8 represents the space between the axel 5 and the magnetic collar bearings 6.

Figure 3C:
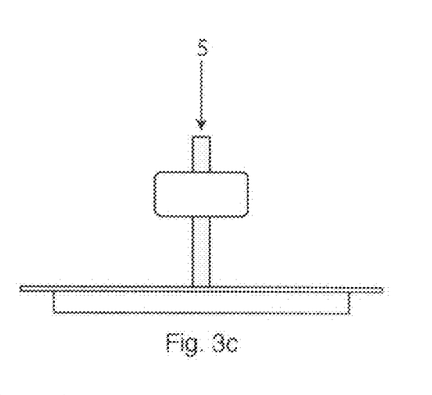
FIG. 3c represents a side view.

FIG. 3c represents a side view of the floating flywheel and axel 5.

FIG. 4 represents the generator component, axel, rotors and stators.

Figures 4A, 4B:
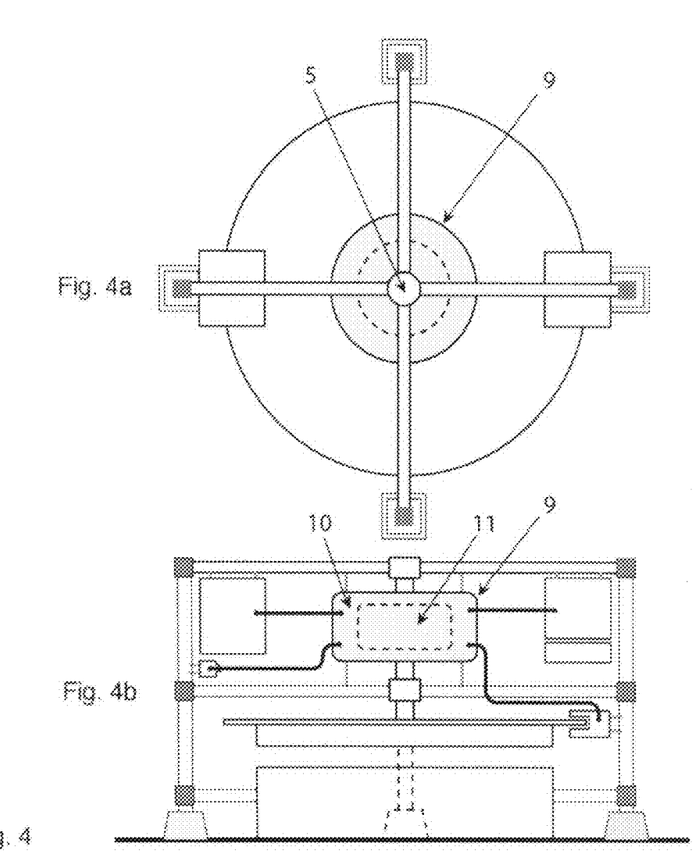
FIG. 4a represents a top view.
FIG. 4b represents a front view.

FIG. 4a represents a top view. The generator component 9 is installed into the flywheel axel 5.

FIG. 4b represents a front view. Space will be built within the generator component 9 to account for slight up and down movement of the floating flywheel assembly herein, FIG. 2 and to allow for no physical contact between the generator rotors 11 and generator stators 10.

Figure 4C:
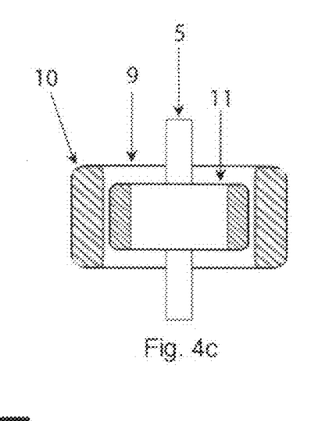
FIG. 4c represents a side view detail.

FIG. 4c represents a side view detail. On the flywheel axel 5, generator rotors 11 rotate inside generator stators 10 to generate electric power inside the generator component 9, such as in an AC or DC power application.

FIG. 5 represents the natural magnet component.

Figure 5A:
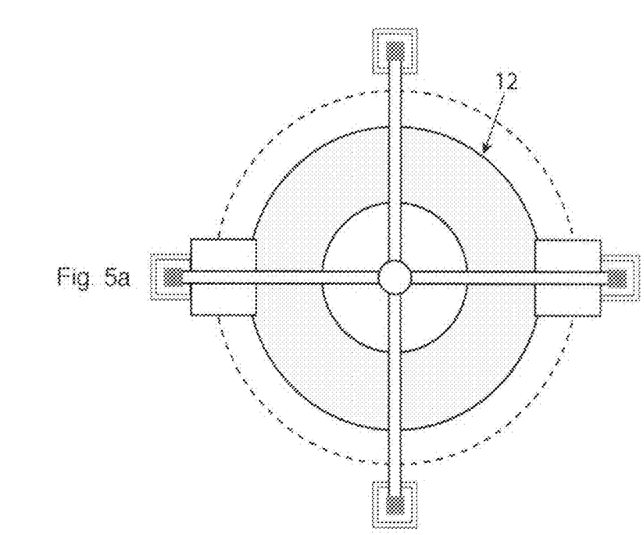
FIG. 5a represents a top view.

FIG. 5a represents a top view. The natural magnet component 12 does not draw any electrical power.

Figure 5B:
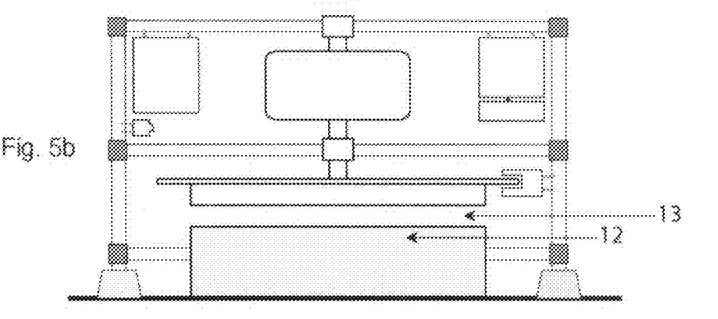
FIG. 5b represents a front view and the clearance from the flywheel assembly.

FIG. 5b represents a front view and the clearance from other components. The gap 13 represents the space between the stationary natural magnet 12 and the rotating floating flywheel assembly herein, FIG. 2. The natural magnetic component 12 charge is always present, and is applied to the floating flywheel assembly herein, FIG. 2 to repel it away from the natural magnet 12.

Figure 5C:
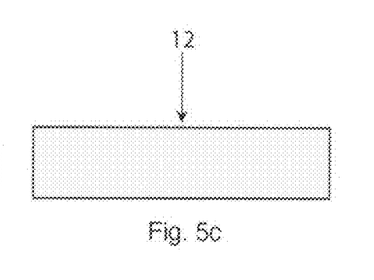
FIG. 5c represents a side view.

FIG. 5c represents a side view of the natural magnet component 12. More than one natural magnet 12 may be required.

FIG. 6 represents the linear induction motor and timing computer components, and an AC/DC inverter.

Figures 6A, 6B:
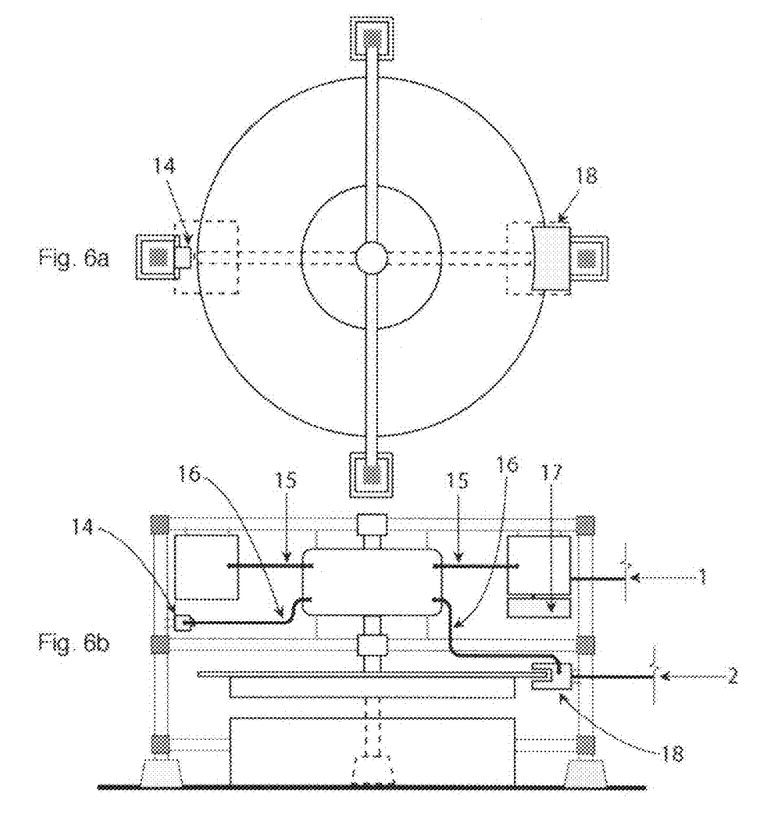
FIG. 6a represents a top view.
FIG. 6b represents a front view and the electrical path of travel between components.

FIG. 6a represents a top view of the linear induction motor 18 and the timing computer 14.

FIG. 6b represents a front view and the electrical path of travel between components. Electric power flows to the linear induction motor 18 via the electrical conduit 2 from an outside source. The linear induction motor 18 sets the floating flywheel assembly herein, FIG. 2 into rotation, and will maintain the rotation throughout operation. The linear induction motor 18 rotates the floating flywheel assembly herein, FIG. 2 with powered magnetic force and without physical contact with the flywheel. The timing computer 14 controls the operation of the linear induction motor 18. The timing computer 14 assesses the speed of the flywheel and subsequently fires the linear induction motor 18 only when necessary to maintain the flywheel rotation. The AC/DC inverter set 17 can convert electric power for use in AC or DC power applications as needed. Electric power is generated in the generator component 9 herein, FIG. 4 during operation. Electric power is distributed from the generator component 9 herein, FIG. 4 to the battery storage component 19 herein, FIG. 7 via power conduits 15. Electric power is also distributed from the generator component 9 herein, FIG. 4 to the timing computer 14 and to assist the linear induction motor 18 via power conduits 16. Electric power is also distributed from the battery storage component 19 herein, FIG. 7 via power conduits 15 and 16 to assist the linear induction motor 18. Surplus electric power is distributed from the battery storage component 19 herein, FIG. 7 or directly from the generator component 9 herein, FIG. 4 to a system, receiver or to supply a load outside of the present invention via the electrical conduit 1.

Figure 6C:
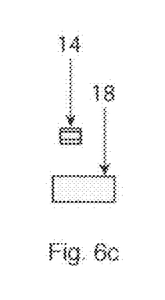
FIG. 6c represents a side view.

FIG. 6c represents a side view of the linear induction motor 18 and the timing computer 14.

FIG. 7 represents the battery storage component.

Figures 7A, 7B:
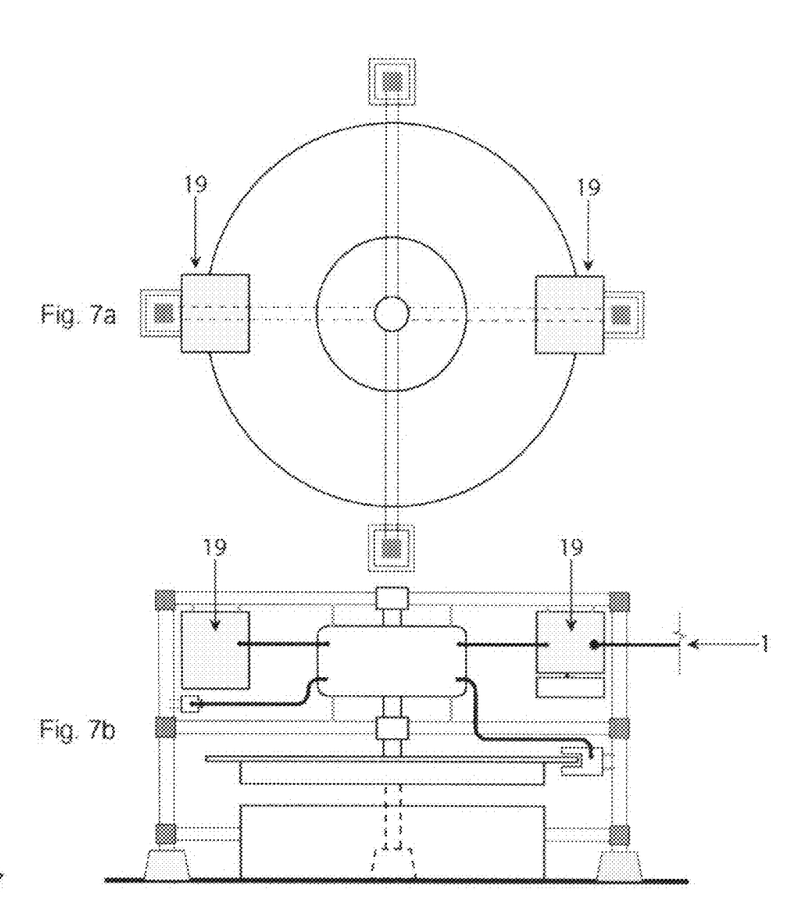
FIG. 7a represents a top view
FIG. 7b represents a front view.

FIG. 7a represents a top view of the battery storage component 19.

FIG. 7b represents a front view. The batteries 19 will store surplus electrical power from the generator component 9 herein, FIG. 4. Surplus electrical power is sent outside of the present invention via the electrical conduit 1.

Figure 7C:
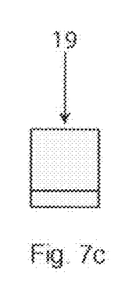
FIG. 7c represents a side view.

FIG. 7c represents a side view of the battery storage component 19.

FIG. 8 represents the vacuum chamber component.

Figure 8A:
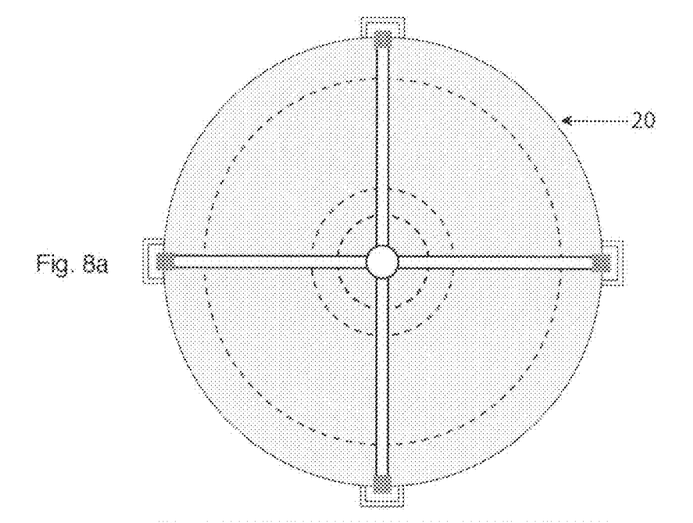
FIG. 8a represents a top view

FIG. 8a represents a top view of the vacuum chamber component 20.

Figure 8B:
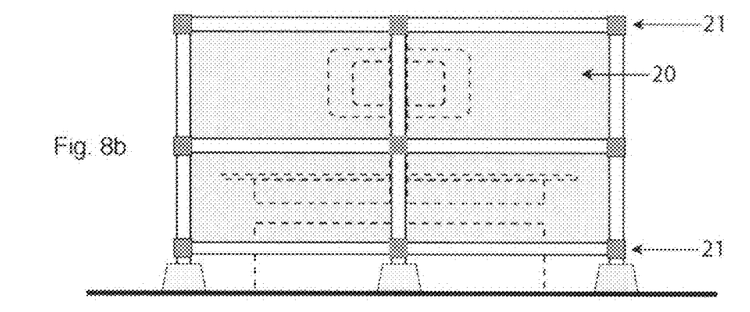
FIG. 8b represents a front view.

FIG. 8b represents a front view. The vacuum chamber component 20 is installed onto the four legged frame 21. The vacuum chamber 20 encloses, but is not limited to the floating flywheel assembly herein, FIG. 2 and the generator component 9 herein, FIG. 4. The vacuum chamber 20 will prevent wind resistance, or windage losses during operation on all moving components.

What is claimed is:

1. A magnetic motor generator having a floating flywheel, comprising of a floating flywheel assembly that is built as one moving piece, wherein the floating flywheel assembly is comprised of a magnetic wheel connected to a metal disk that is rotated by a linear induction motor component, wherein the magnetic wheel is not solid steel, but is comprised of magnets that have a magnetic charge that repels the magnetic wheel away from a stationary natural magnet component, wherein the stationary natural magnet is installed underneath the magnetic wheel and which subsequently repels the entire floating flywheel assembly, wherein the floating flywheel assembly is additionally comprised of an axel that rotates inside two magnetic collar bearings, wherein the axel is not solid steel, but a metal shaft surrounded by a donut-like magnet that has a magnetic charge, wherein the magnetic collar bearings are comprised of repelling stationary magnets that center the axel at speed, wherein the floating flywheel assembly is additionally comprised of a generator rotor component on the axel which rotates inside a generator stator component.

2. A magnetic motor generator having a floating flywheel of claim 1, further comprising of a floating flywheel assembly that does not have physical contact with any other components in order to prevent bearing losses during operation, wherein there is a gap of space between a magnetic wheel of the floating flywheel assembly and a stationary natural magnet installed underneath the flywheel assembly, wherein there is a gap of space between a metal disk of the floating flywheel assembly and a linear induction motor, wherein there is a gap of space between an axel of the floating flywheel assembly and two magnetic collar bearings, wherein there is a gap of space between generator rotors of the floating flywheel assembly and generator stators of a generator component.

3. A magnetic motor generator having a floating flywheel of claim 1, further comprising of a linear induction motor that starts the rotation of a floating flywheel assembly, wherein the linear induction motor will maintain the floating flywheel assembly rotation throughout operation, wherein the linear induction motor sets the floating flywheel assembly into rotation by powered magnetic force without having physical contact with a metal disk of the floating flywheel assembly, wherein a timing computer controls the operation of the linear induction motor and assesses the speed of the floating flywheel assembly, wherein the timing computer fires the linear induction motor temporarily and only when necessary to maintain the operating rotation of the floating flywheel assembly.

4. A magnetic motor generator having a floating flywheel of claim 1, further comprising of an electrical power conduit that receives an outside source of electric power that enters the magnetic motor generator assembly and travels to a linear induction motor, wherein the linear induction motor sets a floating flywheel assembly into rotation, wherein electric power is generated in a generator component by the rotation of a rotor component of the floating flywheel assembly that rotates inside stators in the generator component, wherein electric power is generated and distributed from the generator component to a battery storage component via power conduits, wherein electric power is additionally distributed from the generator component to a timing computer and to assist the linear induction motor via power conduits, wherein electric power is additionally distributed from the battery storage component to assist the linear induction motor via power conduits, wherein an AC/DC inverter component will convert electric power for use in AC or DC power applications as needed, wherein surplus electric power is distributed from the battery storage component or directly distributed from the generator component via electrical power conduits, wherein electricity is generated by converting the stored rotational mechanical energy of the floating flywheel assembly back into electric power to be used by an outside system, receiver or to supply a load.

5. A magnetic motor generator having a floating flywheel of claim 1, further comprising of a floating flywheel assembly that rotates and is enclosed inside a vacuum chamber component, wherein the vacuum chamber component is installed onto a frame and encloses all moving components and is not limited to the floating flywheel assembly, wherein the vacuum chamber encloses a generator component of the floating flywheel assembly and all moving components in order to prevent wind resistance during rotation, or windage losses during operation.

* * * * *